United States Patent [19]

Uchino

[11] Patent Number: 5,781,755
[45] Date of Patent: Jul. 14, 1998

[54] INITIAL PROGRAM LOADING OF VIRTUAL MACHINE

[75] Inventor: Minoru Uchino, Numazu, Japan

[73] Assignee: Fujitsu Limited, Kawasaki, Japan

[21] Appl. No.: 788,029

[22] Filed: Jan. 23, 1997

Related U.S. Application Data

[63] Continuation of Ser. No. 498,647, Jul. 6, 1995, abandoned, which is a continuation of Ser. No. 705,561, May 24, 1991, abandoned.

[30] Foreign Application Priority Data

May 25, 1990 [JP] Japan .................................. 2-136851

[51] Int. Cl.⁶ .................................................. G06F 9/46
[52] U.S. Cl. .................................. 395/406 R; 395/652
[58] Field of Search ............................. 395/406 R, 652

[56] References Cited

U.S. PATENT DOCUMENTS

| | | | |
|---|---|---|---|
| 4,456,954 | 6/1984 | Bullions, III et al. | 364/200 |
| 4,660,144 | 4/1987 | Walsh | 364/200 |
| 4,812,975 | 3/1989 | Adachi et al. | 364/300 |
| 4,814,975 | 3/1989 | Hirosawa et al. | 395/375 |
| 4,835,677 | 5/1989 | Sato et al. | 395/700 |
| 4,860,190 | 8/1989 | Kaneda et al. | 364/200 |
| 4,885,681 | 12/1989 | Umeno et al. | 395/700 |
| 4,887,202 | 12/1989 | Tanaka et al. | 364/200 |
| 4,916,608 | 4/1990 | Shultz | 364/200 |
| 4,970,639 | 11/1990 | Diefendorf et al. | 395/700 |
| 5,077,654 | 12/1991 | Ohtsuki | 395/800 |
| 5,088,031 | 2/1992 | Takasaki et al. | 395/400 |
| 5,210,844 | 5/1993 | Shimura et al. | 395/425 |
| 5,276,815 | 1/1994 | Nakashima et al. | 395/275 |

FOREIGN PATENT DOCUMENTS

| | | |
|---|---|---|
| 0 055 533 | 7/1982 | European Pat. Off. . |
| 0 055 553 | 7/1982 | European Pat. Off. . |
| 0 100 140 | 2/1984 | European Pat. Off. . |
| 58-169657 | 1/1984 | Japan . |

OTHER PUBLICATIONS

Tallman, P. H., Microprogramming and Systems Architecture, International Computer State of the Art Report, Virtual Machine Assist Feature Microcode Implementation, pp. 527–540, 1975, Infotech Information, Maidenhead Berks, UK.

Patent Abstracts of Japan, vol. 8, No. 10 (P-248)(1447) Jan. 18, 1984 & JP-A-58 169 657 (Fujitsu).

*Primary Examiner*—Lucien U. Toplu
*Attorney, Agent, or Firm*—Staas & Halsey

[57] ABSTRACT

A virtual machine system comprised of a real machine having a virtual machine control monitor including an initial program loading emulation part and a virtual machine and an outer memory connected to the real machine. A virtual machine assist mechanism is provided in the real machine for offering a control mechanism of the virtual machine by firmware. At an initial program loading stage, when an input-output substitutional generation command is generated at the initial program loading emulation part in the virtual machine control monitor, an actual data transmission is executed from the outer memory to the area of the virtual machine, as if an input-output request were generated at the virtual machine. In addition, an input-output interruption after the execution of data transmission is transferred from the outer memory to the virtual machine assist mechanism by the control of the input-output substitutional generation command. Accordingly, an initial program loading emulation is executed independently of the initializing program of the operating system and the volume of the initial program loading emulation program is thereby reduced.

9 Claims, 6 Drawing Sheets

Fig. 1

PRIOR ART

VM ASSIST MECHANISM

MANAGEMENT DATA TABLE FOR HEAD ADDRESS OF VM

VMID = 0
VMID = 1
VMID = 2  HEAD ADDRESS OF VM1
VMID = 3  HEAD ADDRESS OF VM2
VMID = 4
⋮
VMID = n

ARRANGEMENT OF MAIN MEMORY

- 0
- AREA FOR VM1 (CCW)
- a
- m'
- AREA FOR VM2
- b
- m

| ADDRESS | VM AREA |
|---|---|
| 0 | IPL-PSW |
| 8 | IPL-CCW1 |
| 10 | IPL-CCW2 |
| 18 | CCW1 FOR READING A BOOT |
| 20 | CCW1 FOR READING A BOOT |
| 28 | |

(HEXADECIMAL)

INITIAL PROGRAM LOADING OF VIRTUAL MACHINE

This application is a continuation of application Ser. No. 08/498,647, filed Jul. 6, 1995, now abandoned; which is a continuation of application Ser. No. 07/705,561 filed May 24, 1991 now abandoned.

BACKGROUND OF THE INVENTION

1. Field of the Invention

The present invention relates to an initial program loading system for a virtual machine emulating an initial program load of an operating system (OS) under the same circumstances as prevail in the virtual machine.

2. Description of the Related Art

Generally, it is known that there are several kinds of computer architecture, as represented by the IBM architecture, and that there are several types of OS running on each machine.

Recently, it has become popular to operate a variety of OS as virtual machines, and this has been expected to reduce an amount of program needed to emulate the initial program loading (IPL) of the OS.

Usually, when emulating an IPL of the OS running on the virtual machine, IPL emulation programs, prepared for each variety of OS or each architecture of the virtual machine, are first transmitted to an area of the virtual machine, and the IPL emulation programs are executed in that area of the virtual machine. A dispatcher, which executes a control to give each virtual machine an execution right on a real central processing unit (CPU), transfers the control to the IPL emulation program transmitted to the virtual machine at a predetermined time.

Since the IPL emulation of the OS is executed in the area of the virtual machine, for the current IPL emulating program, a channel command word (CCW) analysis and processing part, an input-output (I/O) execution and processing part, an IPL emulation end information part, and so on, must be included as basic parts of the emulation.

The CCW analysis and processing part executes an operation of generating a CCW to read a OS initializing program (bootstrap or boot) from a system volume for each OS; the I/O execution and processing part generates a starting input-output (SIO) command to read data from the system volume, which is an outer memory device; and the IPL emulation end information part informs the virtual machine control monitor of an end of the IPL emulation, by an I/O interruption.

Further, to cope with a malfunction during the emulation, it is also necessary to provide an abnormality processing part for executing a program interruption, machine check interruption and so on, in the emulation program, similar to that found in a common OS.

Nevertheless, if the architecture of the virtual machine is different, it is necessary to create IPL emulation programs for each architecture, since each of the IPL emulation programs are useful only for a particular virtual machine.

Further, since an OS initializing program (a bootstrap) may be constructed individually for each OS, an address of the IPL emulation program and an address of the individual OS initializing program in the area of the virtual machine may be the same. To avoid this, it is necessary to confirm the operating address of the OS initializing program operation at the virtual machine, and to make the arrangement thereof. The confirmation of the operating address of the OS initializing program operation at the virtual machine is realized, for example, by the programmer carrying out an experimental operation using the OS initializing program.

Accordingly, in the prior art, a problem exists in the requirement for much effort when developing and maintaining the IPL emulation programs.

SUMMARY OF THE INVENTION

An object of the present invention is to provide an initial program loading system for a virtual machine for executing an IPL emulation program independent from an OS initializing program, and which is able to reduce the volume of the IPL emulation program.

According to an aspect of the present invention, there is provided an initial program loading system of a virtual machine for emulating an)IPL of an OS for controlling a virtual machine by a virtual machine control monitor. The invention comprises a virtual machine assist mechanism for controlling an I/O execution instruction command generated by an I/O substitutional generation command. In addition, an interrupt destination of an I/O interruption is created by a virtual machine control monitor, and a destination of the data transmission is in an area of a virtual machine control monitor. The invention also comprises an IPL emulation part for instructing an I/O execution of a CCW for reading a boot by the I/O substitutional generation command. The I/O substitutional generation command transmits a CCW for reading a boot to an area of a virtual machine of an IPL target and combining the CCW for reading a boot and CCW for IPL of a bootstrap routine on the system volume which is read by the CCW for reading a boot. Once the IPL of the system volume bootstrap is read into the virtual machine, the IPL of an operating system is executed.

According to the present invention, the instruction for the I/O execution is executed by the virtual machine control monitor. However, the function of transmitting the actual data to the area of the virtual machine and the function of interrupting the I/O interruption after the I/O execution by the virtual machine control monitor are realized by the control of the I/O substitutional generation command sent by the virtual machine assist mechanism. Accordingly, it is not necessary to run the IPL emulation program in the virtual machine and the emulation can be carried out by the virtual machine control monitor having the IPL emulation part which is common to each OS.

In this way, the I/O execution for IPL emulation is instructed by the virtual machine control monitor, and thus it becomes possible to delete, for example, the IPL emulation end information part. The abnormal processing part for processing an abnormal program interruption or an abnormal machine check interruption from the program equivalent from the conventional IPL emulation program can also be eliminated, thereby reducing the scale of the development of the program relating to the IPL emulation.

BRIEF DESCRIPTION OF THE DRAWINGS

The present invention will be more clearly understood from the description as set forth below, with reference to the accompanying drawings wherein.

DESCRIPTION OF THE PREFERRED EMBODIMENTS

Before describing the preferred embodiments, an explanation will be given of a conventional IPL emulation in a virtual machine, with reference to FIG. 1.

Figure 1:
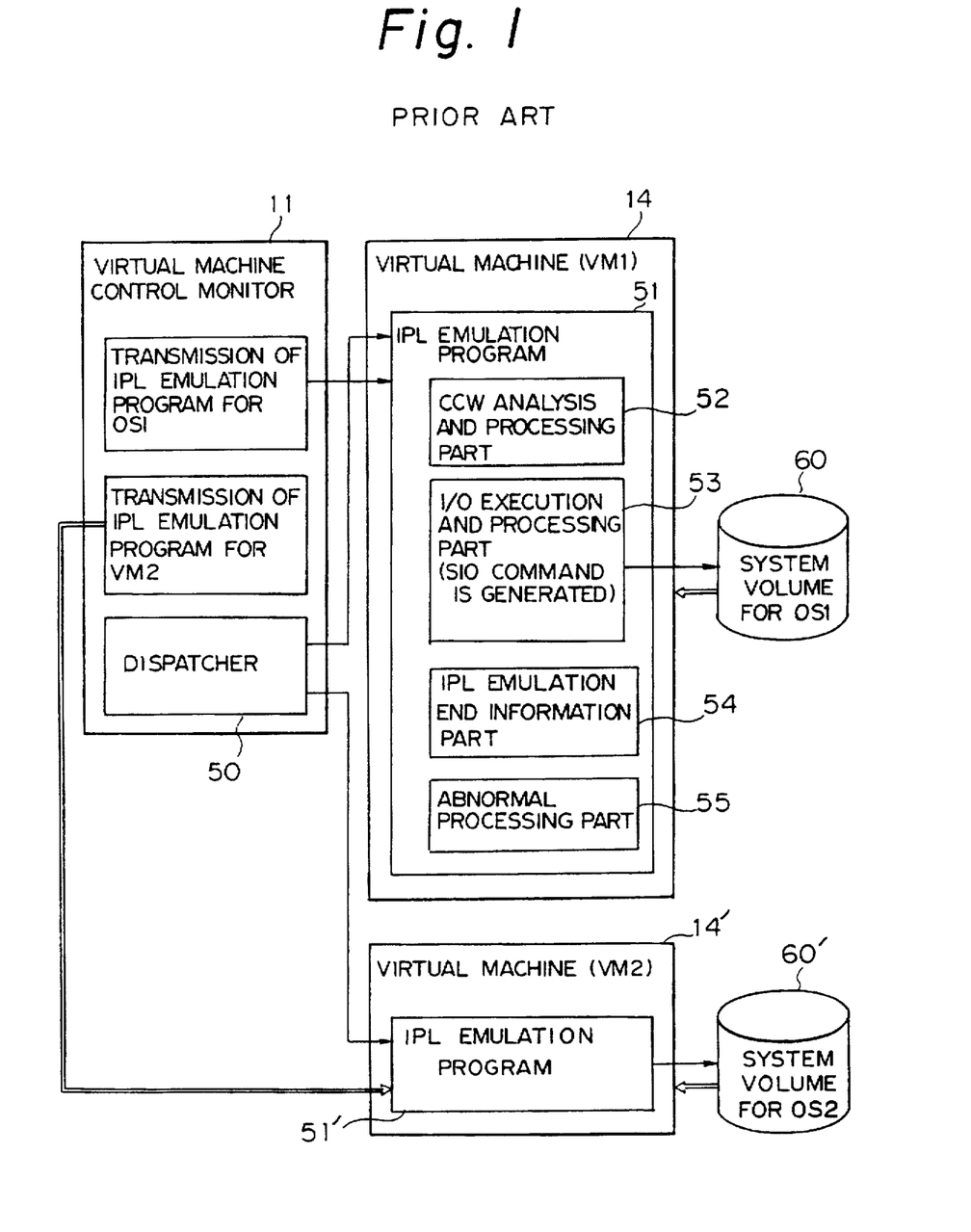
FIG. 1 shows a schematic block diagram for explaining a conventional IPL emulation.

FIG. 1 is a schematic block diagram explaining a conventional IPL emulation for a virtual machine.

In FIG. 1, reference numeral 11 denotes a virtual machine control monitor having a dispatcher 50, reference numeral 14 denotes a first virtual machine (VM1) having an emulation program 51. The emulation program 51 contains a CCW analysis and processing part 52, an I/O execution and processing part 53 where an SIO (start I/O) instruction is generated, an IPL emulation end information part 54, and an abnormal state processing part 55. Reference numeral 14' denotes a second virtual machine (VM2) having an IPL emulation program 51'. Reference numeral 60 denotes a system volume for a first operating system (OS1) which is an outer memory wherein a monitor part of each OS is stored, and reference numeral 60' denotes a system volume for a second operating system (OS2). The virtual machine control monitor 11 transmits an IPL emulation program for the OS1 and for the OS2.

Usually, when emulating an IPL of the OS running in the virtual machines 14 and 14', IPL emulation programs 51 and 51' prepared for each variety of OS or each architecture of the virtual machine are transmitted to an area in the virtual machines 14 and 14', and the IPL emulation programs 51 and 51' are executed in that area of the virtual machine. A dispatcher 50, which executes control to give each virtual machine an execution right for a real CPU, transfers control to the IPL emulation program 51 and 51' transmitted to the virtual machine 14 and 14' at a predetermined time.

Since the current IPL emulation of the OS is executed in the area of the virtual machine, the IPL emulation programs 51 and 51' a CCW (channel command word) analysis and processing part 52, an I/O execution and processing part 53, an IPL emulation end information part 54, and so on must also be included as basis parts of the emulation.

The CCW analysis and processing part 52 executes an operation of analyzing the CCW (channel command word) to read a bootstrap routine on the system volume 60 for each OS; the I/O execution and processing part 53 generates a start input-output (SIO) command to read data from the system volume 60; and the IPL emulation end information part 54 informs the virtual machine control monitor 11 of an end of the IPL emulation by an interruption which occurs at the end of the I/O.

Further, to cope with the occurrence of an abnormal state during the emulation, it is also necessary to provide the abnormal processing part 55 to execute a program interruption, machine check interruption, and so on in the emulation program 51, similar to a common OS.

Nevertheless, if the architecture of the virtual machine is different, it is necessary to create IPL emulation programs 51 and 51' for each different architecture, since each of the IPL emulation programs 51 and 51' work as one OS at each virtual machine 14 and 14' respectively.

Further, since an OS initializing program (a bootstrap program) may be constructed individually for each OS, an address of the IPL emulation programs 51 and 51' and the address of the individual initializing program for OS in the area of the virtual machine may be the same. To avoid this, it is necessary to confirm an operating position of the OS initializing program for operating in the virtual machine, and to make the arrangement thereof.

Accordingly, in the prior art, the problem exists of the requirement for much effort when developing and maintaining the IPL emulation programs 51 and 51'.

Figure 2:
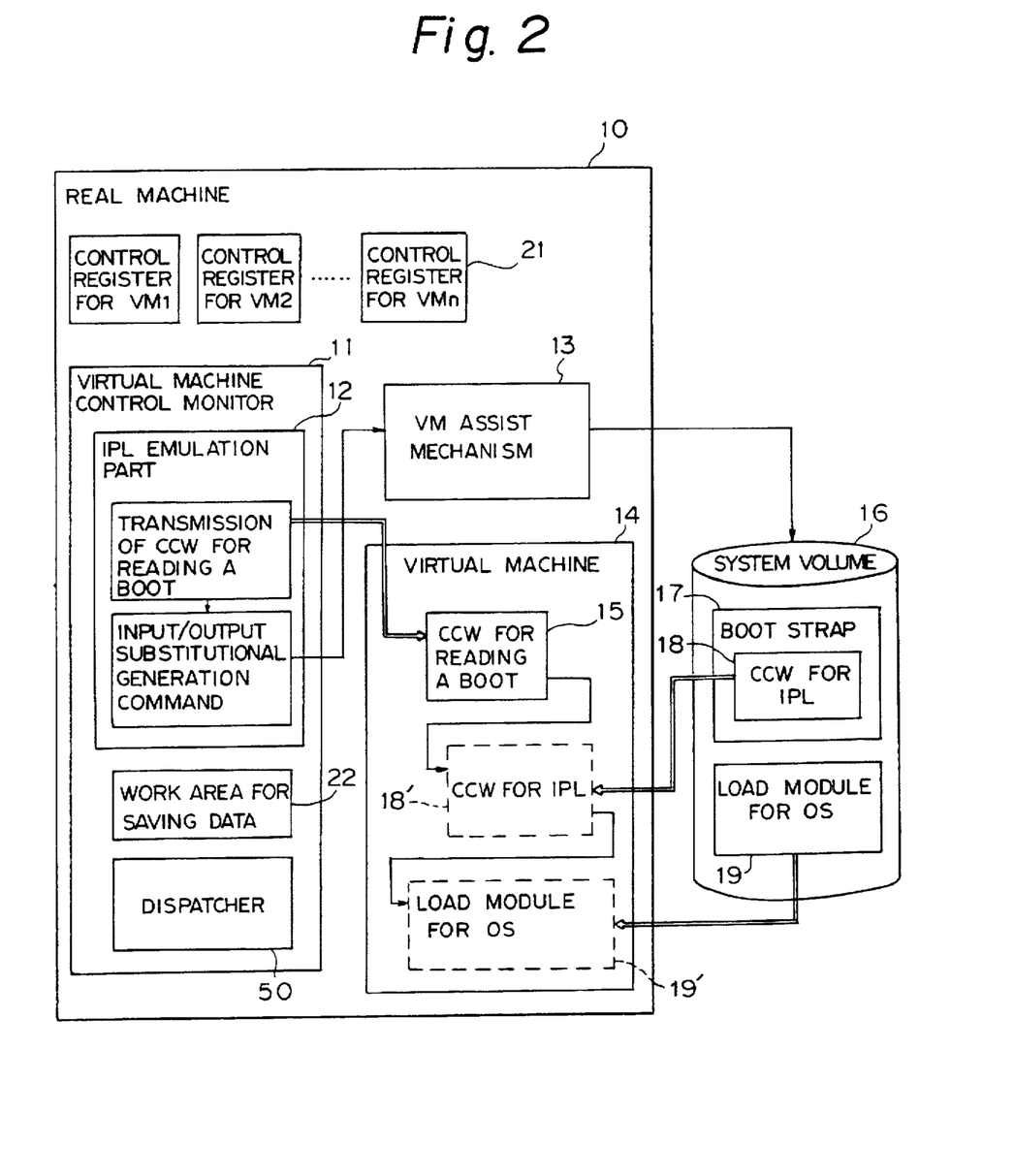
FIG. 2 is a schematic block diagram for explaining an IPL emulation according to the present invention.

FIG. 2 shows a schematic block diagram explaining an IPL emulation according to the present invention.

In FIG. 2, reference numeral 10 denotes a real machine comprising a CPU, memory, and so on. Reference numeral 11 denotes a virtual machine control monitor for maintaining an operating environment of a virtual machine and controlling the virtual machine; reference numeral 12 denotes an IPL emulation part for emulating an IPL of OS which runs on the virtual machine. Reference numeral 13 denotes a virtual machine assist mechanism (VM assist mechanism) providing a control mechanism of the virtual machine as firmware; reference numeral 14 denotes a virtual machine given a virtual machine environment (other virtual machines are not shown in FIG. 2). Reference numeral 15 denotes a CCW for reading a boot routine; reference numeral 16 denotes a system volume for storing an OS initializing program (bootstrap) which runs in the virtual machine 14. Reference numeral 17 denotes a bootstrap routine existing in a specified block of the system volume 16; reference numeral 18 denotes a CCW for the IPL of the OS; reference numeral 19 denotes an OS load module which is intended to run at the virtual machine 14. Reference numeral 21 denotes a number of control registers VM1 to VMn; reference numeral 22 denotes a work area for saving data; and, reference numeral 50 denotes the dispatcher.

In the present invention, IPL emulation programs for each OS are not prepared; instead, an IPL emulation part 12 able to operate an IPL emulation commonly for each OS is prepared.

In the present invention, the IPL emulation part 12 must generate a start I/O command for the IPL instead of the virtual machine 14, whereby an I/O substitutional generation command is provided. When this I/O substitutional generation command is executed, the VM assist mechanism 13 controls the I/O as follows: the virtual machine control monitor 11 becomes a generation source of an I/O execution instruction command, and the data to be transmitted is in the area of the virtual machine 14.

When the instruction for an IPL emulation is received, the IPL emulation part 12 transmits the CCW 15 for reading the bootstrap routine, of system volume 16 into the area of the virtual machine 14, to emulate the initial program loading (IPL) of the OS. The CCW 15 for reading the bootstrap routine is previously set to combine with the CCW 18 for IPL of the bootstrap 17 which is read by the CCW 15.

After that, the IPL emulation part 12 executes the I/O substitutional generation command for executing an I/O of the CCW 15 for reading the boot program. Accordingly, the CCW 18 for IPL is read into the area of the virtual machine 18', and further, the bootstrap of the CCW 18 for IPL is executed by the virtual machine. Furthermore, a loader for loading the OS load module 19 or a CCW for reading is read from the CCW 18 for the IPL into the area of the virtual machine 19'.

In the present invention, the instruction for the I/O execution is executed by the virtual machine control monitor 11, but the function of transmitting the actual data to the area of the virtual machine 14 and the function of intercepting the I/O interruption after the I/O execution by the virtual machine control monitor 11 are realized by the control of the I/O substitutional generation command provided by the VM assist mechanism 13. Accordingly, it is not necessary to run the IPL emulation program in the virtual machine and the emulation can be executed by the virtual machine control monitor 11 having the IPL emulation part 12 which is common for each OS.

In this way, the execution of I/O for the IPL emulation is performed by the virtual machine control monitor 11, so that it becomes possible to delete, for example, the CCW analysis and processing part 52, I/O execution and processing part 53, the IPL emulation end information part 54 and the abnormal processing part 55 from the virtual machine 14 as shown in FIG. 1, thereby reducing the scale of the development of the program related to the IPL emulation.

Figure 3:
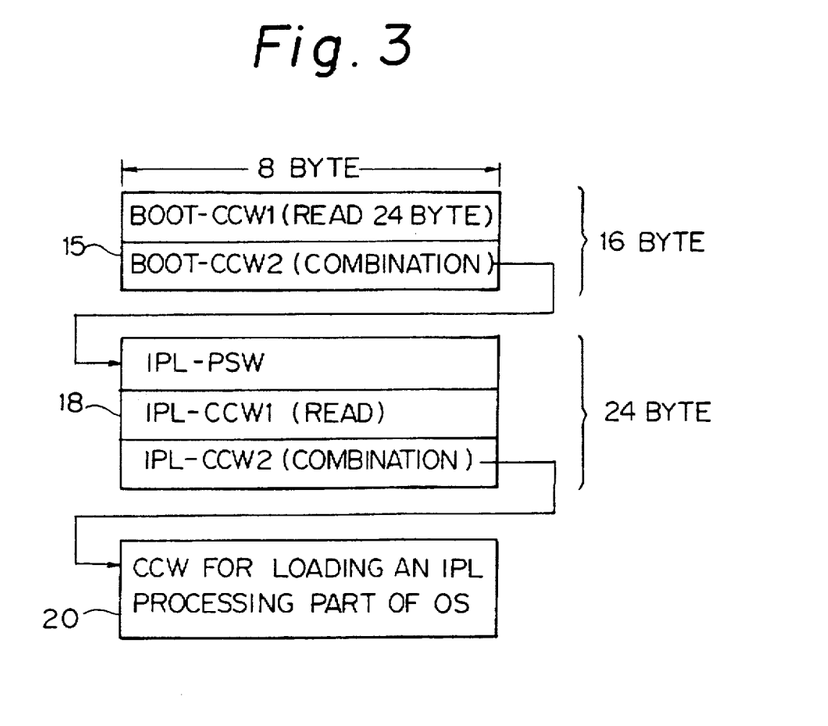
FIG. 3 shows a diagram of a CCW for use in an IPL emulation according to one embodiment of the present invention.
Figure 4:
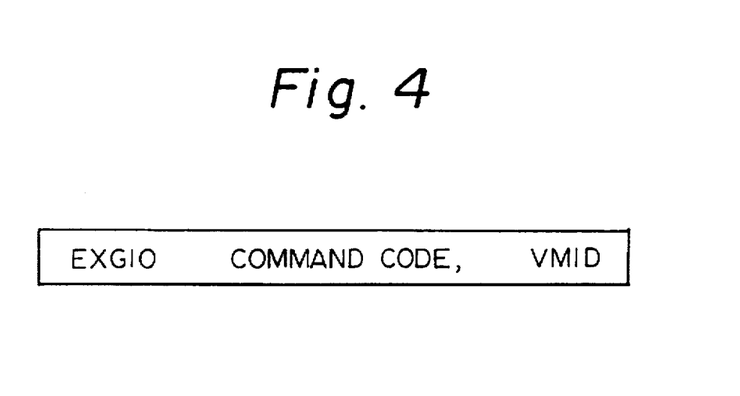
FIG. 4 is a diagram of an I/O substitutional generation command according to one embodiment of the present invention.
Figure 5:
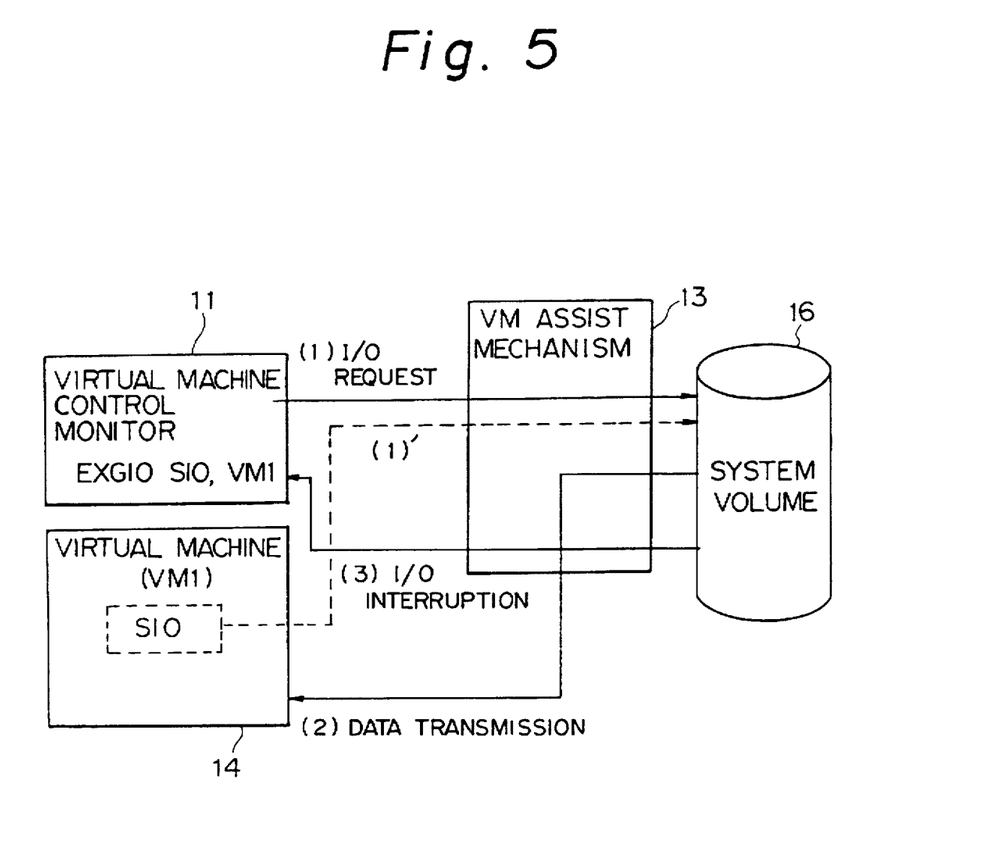
FIG. 5 is a diagram of an IPL emulation according to the present invention.

FIG. 3 shows the construction of one embodiment of the CCW using the IPL emulation according to the present invention. FIG. 4 explains the I/O substitutional generation command according to the present invention, and FIG. 5 is an explanatory flowchart of the IPL emulation according to the present invention.

The CCW (channel command word) used in the IPL emulation is constructed, for example, as shown in FIG. 3. The CCW 15 for reading a boot comprises a channel command BOOT-CCW1 and a channel command BOOT-CCW2. The channel command BOOT-CCW1 is used for reading the CCW 18 for an IPL of 24 bytes from the bootstrap 17 of the system volume 16 as shown in FIG. 2, and a channel command BOOT-CCW2 is used for combining the bootstrap at an eighth byte of the read CCW 18 for the IPL.

The CCW 18 for the IPL and CCW 20 for loading an IPL processing part of the OS of FIG. 3 are created by a programmer of the OS initialized program at the same time as the programmer creates the initialized program.

The CCW 18 for the IPL comprises a command address IPL-PSW (program status word), a channel command IPL-CCW1, and a command IPL-CCW2 as shown in FIG. 3. The command address IPL-PSW is the address where data indicating the command execution position of the OS at first is set by the user, the channel command IPL-CCW1 is used for reading the CCW 20 for loading an IPL processing part of OS, and the command IPL-CCW2 is used for combining the bootstrap with the read CCW 20. The CCW 18 for the IPL is 24 bytes, but the actual bootstrap is 16 bytes and excludes the byte for the IPL-PSW.

The content of the substitutional generation command when generated by the virtual machine control monitor instead of by the virtual machine is shown in FIG. 4. The name of the command is EXGIO and operands thereof are a command code for a command being substituted and a virtual machine identifier (VMID). These are converted into a predetermined machine language. According to this command, the VM assist mechanism 13 processes the control as if the OS running at the virtual machine 14 indicated by VMID has generated the command indicated by the command code.

As shown in FIG. 5, when the virtual machine control monitor 11 generates the command EXGIO, the data transmission is executed as follows:

(1) an I/O request, which is an instruction requiring an I/O, is transmitted from the virtual machine control monitor to the VM assist mechanism 13;

(1)' the VM assist mechanism 13 transmits the I/O request as if this I/O request were generated at the virtual machine 14 having an identifier VM1 as a start I/O (SIO) command;

(2) the VM assist mechanism 13 executes the data transmission from the system volume 16 indicated by the channel program to the area of the virtual machine 14; and (3) when this I/O operation is finished, an I/O interruption is executed by the virtual machine control monitor 11 via the VM assist mechanism 13.

Figure 6:
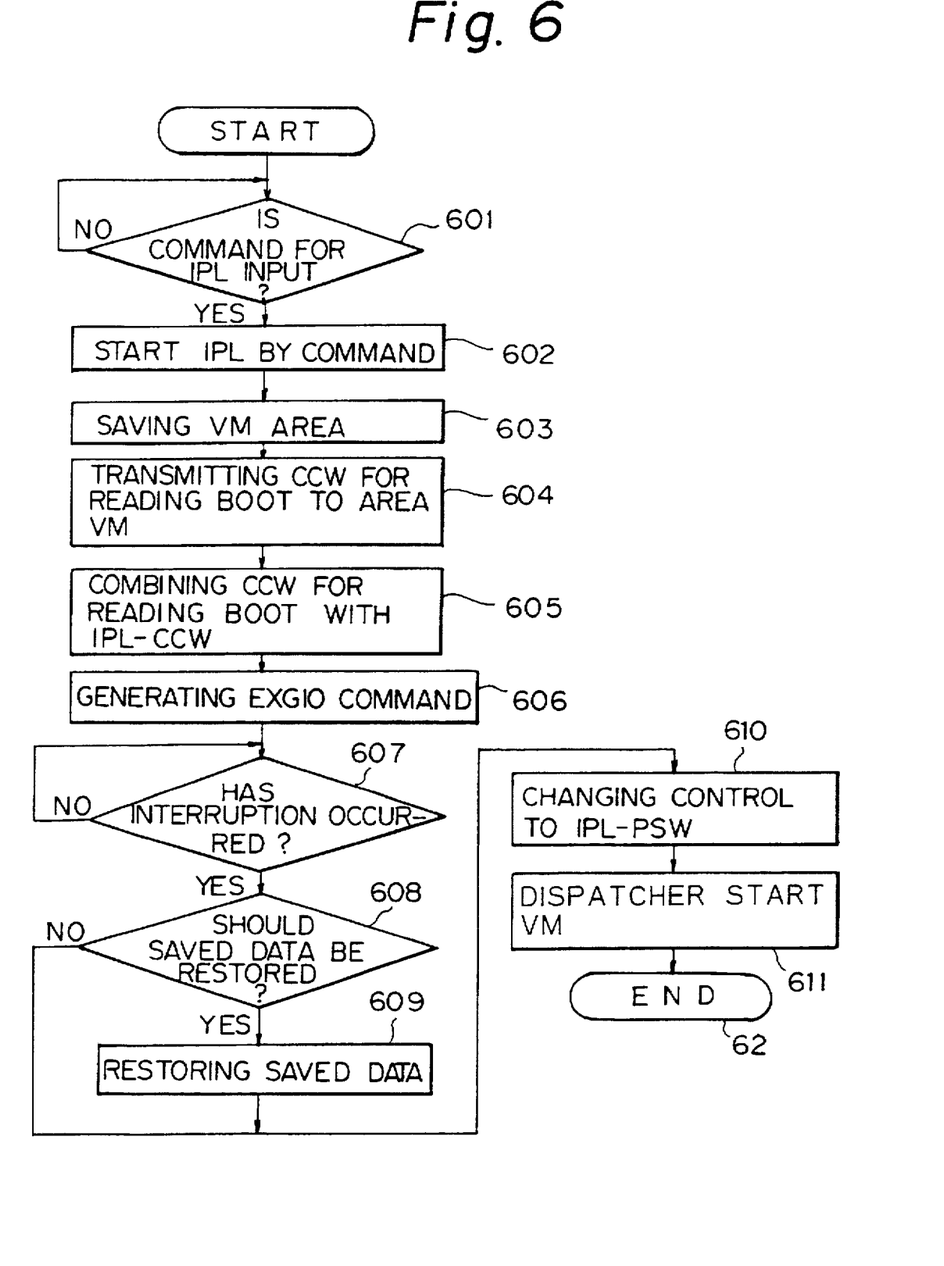
FIG. 6 is a flowchart for explaining the operation of the IPL emulation part according to one embodiment of the present invention.

FIG. 6 is a flowchart explaining the operation of the IPL emulation part 12 as shown in FIG. 2.

At step 601, it is determined whether or not the command for an IPL is input. If the command for the IPL is input, the control proceeds to step 602 and the IPL emulation of the OS is started, but if the command for the IPL is not input, the control waits for the command to input. The command for the IPL is input by the operator and the object device of the IPL is also indicated by the operator at the same time.

After the input of the command for the IPL, a saving the area of the virtual machine wherein the sixteen bytes of BOOT-CCW are transmitted is executed as a preparation for the IPL emulation at step 603. The work area 22 for saving the data as shown in FIG. 2 is used for saving the area of the virtual machine, and sixteen bytes of the data from the twenty-fourth address of the area of the virtual machine are saved in the work area 22. The operation of step 603 enables the data in the area of the virtual machine 14, which would be destroyed by the emulation, to be saved.

Figure 8:
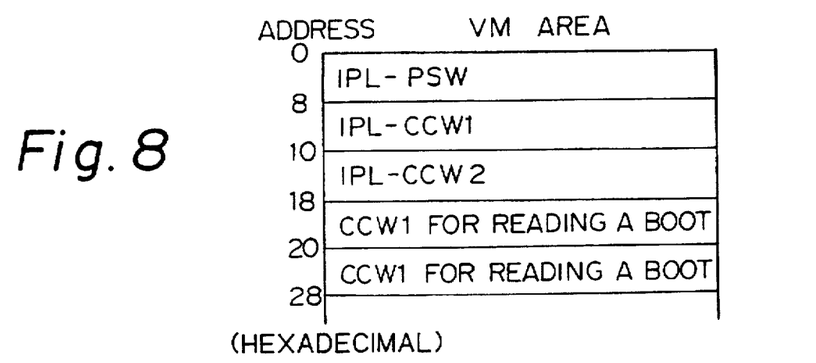
FIG. 8 shows a condition of an area of a virtual machine during the IPL emulation.

At step 604, sixteen bytes of the CCW for reading the boot of the indicated device are transmitted from the system volume 16 to the area of the virtual machine 14. Then, at step 605, the CCW for reading the boot is combined with the CCW for the IPL. In this operation, a position of the IPL-CCW (8th address) is set up at a CCW position of the CCW2 for reading a boot. FIG. 8 shows a table of VM (virtual machine) area, and explains an address and the contents thereof.

Figure 7:
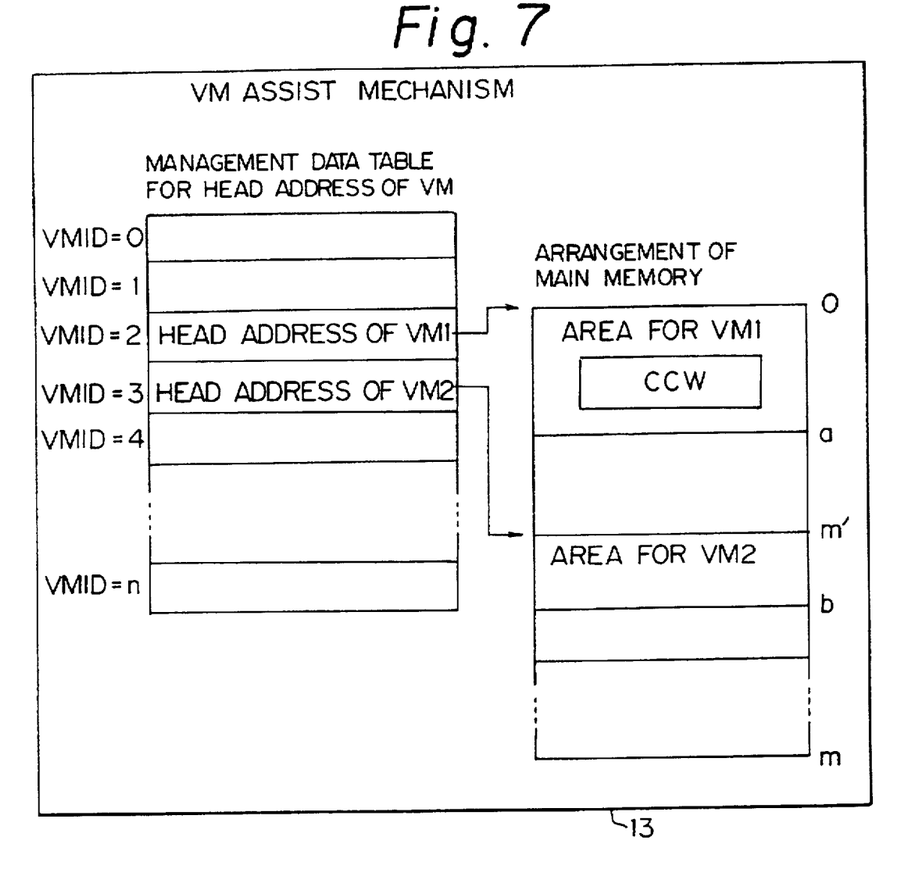
FIG. 7 is a diagram for explaining construction of a virtual machine assist mechanism according to the present invention.

At step 606, a command EXGIO is generated at the virtual machine control monitor 11. In this operation, VMID is first retrieved from a management data table for the heading address of virtual machine shown in FIG. 7, and then the SIO command is instructed to generate the command EXGIO. As shown in FIG. 7, the management data table for the heading address of the virtual machine is provided for each virtual machine in the VM assist mechanism, and the position of the management data table is instructed by the VMID indicated by the command EXGIO. Namely, a main memory of the virtual machine to be used is informed that the address thereof is from 0 to m', by the command EXGIO. Further, the VM assist mechanism 13 executes the calculation of the position of a data in the process of data transmission between the I/O devices as (Data Position)= (Address in virtual machine area)+(virtual machine heading address).

The command EXGIO is executed under the condition that the command code of the operand is considered to be the code of the start I/O command which executes the CCW for reading the boot, and VMID is considered to be the identifier of a virtual machine which is the object of the IPL. In this way, the I/O of the CCW for reading the boot and the CCW for the IPL, and further the CCW combined therewith, are executed.

At step 607 of FIG. 6, it is determined whether or not the interruption occurred because the I/O end interruption is generated and received by the VM assist mechanism 13 when the I/O is finished, as explained in FIG. 5. At this step, it is also determined whether or not the received I/O interruption is from the virtual machine control monitor. If the interruption from the virtual machine control monitor is received, the control proceeds to step 608 but if the interruption is not received or a received interruption is not from the virtual machine control monitor, the control waits until the interruption from the virtual machine control monitor is received.

At step 608, it is determined whether or not the saved data should be restored, and the control proceeds to step 609 to restore the saved data if the saved data is determined to be restored. If the saved data should not be restored, the control skips the step 609 and proceeds to step 610. The case in which the saved data should not be restored is that where the load module has been already written in the virtual machine area.

Then at step 610, the right of the control is changed from the IPL emulation part 12 to the IPL-PSW of the virtual machine 14 by the control of the dispatcher 50. Namely, when the right of the control is changed to the virtual machine 14, the value of IPL-PSW indicated by the first eight bytes of the CCW 18 for reading the boot is input into the control register of the virtual machine indicated by VMID, and then the IPL emulation is finished.

After the end of the IPL emulation, the dispatcher 50 starts the virtual machine at step 611, and this routine is completed at step 612.

The present invention as described above, is not concerned with the operational environment of the OS initialized program running at the virtual machine, and can realize an IPL emulation independently of the OS initialized program in the IPL emulation program.

What we claim is:

1. A virtual machine initial program loading system, including:

a CPU;

a memory storing data and being allocated to a plurality of virtual machines;

a virtual machine monitor for controlling said virtual machines; and an external storage unit storing operating system programs for said virtual machines wherein:

a data transmission between said memory and said external storage unit is carried out by execution of channel command words in said memory;

the program which has requested said data transmission is interrupted when the data transmission is completed, said channel command words are combined and are continuously carried out when a combination command word in said channel command words is used in said virtual machine monitor or in a virtual machine area, and said external storage unit storing initial program-loading channel command words; and a virtual machine assist mechanism transmitting data between a virtual machine area specified by said virtual machine and said external storage in accordance with said channel command word in said virtual machine area, and interrupting said virtual machine memory when said virtual machine assist mechanism is interrupted by said external storage unit, wherein said virtual machine monitor performs the steps of:

(1) transmitting a BOOT channel command word to said virtual machine area;

(2) requesting the virtual machine assist mechanism to perform said BOOT channel command word in the virtual machine area;

(3) waiting until being interrupted by said virtual machine assist mechanism; and (4) starting said initial program of said operating system loaded into said virtual machine area, wherein said BOOT channel command words including a first read command word and a combination command word;

said first read command word reads said initial program-loading channel command words stored in said external storage, into said virtual machine area;

said combination command word combines said first read command word and said initial program-loading channel command words to make a command chain; and said initial program loading channel command words including a second read command word for reading an initial program of the operating system stored in said external storage unit.

2. A virtual machine initial program loading system, as recited in claim 1, further comprising:

the memory including a plurality of operating systems; and a real machine, connected to said memory, having at least said CPU and said memory, said real machine having said plurality of virtual machines in a virtual machine environment, said real machine including said virtual machine assist mechanism to control said virtual machines by controlling input-output operation of data transmission to said virtual machines, and said real machine having said virtual machine control monitor creating an execution environment for said virtual machines and controlling said virtual machines, said virtual machine control monitor comprising an initial program loading emulation part emulating an initial program loading of at least one type of said operating systems into at least one virtual machine, said initial program loading emulation part generating an input-output generation command for an initial program loading to execute an emulation of at least the one type of said operating system, said input-output generation command including at least an identifier of a virtual machine, and said virtual machine assist mechanism controlling said input-output operation between said memory and a storage area of a virtual machine specified by said virtual machine identifier and noticing the completion of said input-out operation to said virtual machine control monitor.

3. An initial program loading apparatus as set forth in claim 1, further comprising:

said BOOT channel command word for reading a boot being created in said one virtual machine by said virtual machine control monitor; and a bootstrap routine having a channel command word for an initial program loading of the one operating system and a load module of the one operating system for running said one virtual machine is stored in said outer memory, wherein said initial program emulation part executes the operations of transmitting said channel command word for reading said boot from said initial program emulation part to said one virtual machine, combining said channel command word for reading the boot and said channel command word for the initial program loading of said bootstrap routine read by said channel command word, and generating said input-output generation command for executing an input-output of said channel command word.

4. An initial program loading apparatus as set forth in claim 3, wherein:

said channel command word for reading a boot and said channel command word for an initial program loading of said bootstrap are predetermined to be combined.

5. An initial program loading apparatus as set forth in claim 2, wherein:

said channel command word for said initial program loading of said bootstrap routine is read in area of said virtual machine by the generation of said input-output substitutional generation command by said initial program emulation part;

a channel program of said channel command word for an initial program loading is executed, and one of a loader for loading said module of said operating system and said channel command word for reading said loader is read from said channel command word.

6. A virtual machine initial program loading system used in a virtual machine environment, as recited in claim 1 and further comprising:

a real machine having said CPU, said memory comprising a main memory and an external memory for storing an operating system to be executed in said virtual machines; and means for creating an execution environment and controlling said virtual machines comprising means, located in a storage area external to said virtual machines, for emulating initial program loading of said operating system by generating and executing an input-output generation command.

7. A virtual machine initial program loading system as recited in claim 1, wherein said virtual machine assist mechanism further performs the steps of:

(a) creating an execution environment and controlling said virtual machines in the CPU;

(b) generating by the CPU an input-output generation command for the initial program loading in a first storage area to execute said initial program loading;

(c) controlling in the CPU said virtual machines by controlling the input-output generation command in a second storage area located external to said virtual machines; and (d) emulating in the CPU the initial program loading of an operating system program to be executed in said virtual machine in the first storage area located external to said virtual machines.

8. A virtual machine initial program loading system used in a virtual machine environment, as recited in claim 1 and further comprising:

a storage area external to the virtual machines in a computer;

means for storing operating systems corresponding to the virtual machines in the memory; and initial program loading emulation means for emulating initial program loaders for loading the operating systems corresponding to the virtual machines, said initial program loading emulation means located in a common area in the memory.

9. An initial program loading apparatus as claimed in claim 1, wherein the virtual machine assist mechanism comprises firmware.

* * * * *